(12) United States Patent
Warkentin et al.

(10) Patent No.: US 11,726,852 B2
(45) Date of Patent: Aug. 15, 2023

(54) HARDWARE-ASSISTED PARAVIRTUALIZED HARDWARE WATCHDOG

(71) Applicant: VMware, Inc., Palo Alto, CA (US)

(72) Inventors: Andrei Warkentin, South Elgin, IL (US); Sunil Kotian, Palo Alto, CA (US); Jared McNeill, Quispamsis (CA); Shruthi Hiriyuru, Medford, MA (US); Alexander Fainkichen, Boston, MA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/577,627

(22) Filed: Jan. 18, 2022

(65) Prior Publication Data
US 2023/0229538 A1    Jul. 20, 2023

(51) Int. Cl.
*G06F 11/00* (2006.01)
*G06F 11/07* (2006.01)
*G06F 9/455* (2018.01)
*G06F 11/14* (2006.01)

(52) U.S. Cl.
CPC ...... *G06F 11/0757* (2013.01); *G06F 9/45541* (2013.01); *G06F 11/0772* (2013.01); *G06F 11/1417* (2013.01); *G06F 11/1484* (2013.01)

(58) Field of Classification Search
CPC ............. G06F 11/0757; G06F 11/0772; G06F 11/1417; G06F 11/1484; G06F 11/0712; G06F 9/45541
See application file for complete search history.

(56) References Cited

U.S. PATENT DOCUMENTS

| | | | | |
|---|---|---|---|---|
| 8,375,258 | B1 * | 2/2013 | Sheets | G06F 11/0721 714/55 |
| 2003/0037172 | A1 * | 2/2003 | Lacombe | G06F 11/0757 714/E11.003 |
| 2006/0161983 | A1 * | 7/2006 | Cothrell | H04L 63/1408 726/23 |
| 2007/0061441 | A1 * | 3/2007 | Landis | G06F 9/45558 709/224 |

(Continued)

*Primary Examiner* — Joseph D Manoskey
(74) *Attorney, Agent, or Firm* — Thomas Horstemeyer, LLP (57) ABSTRACT

A hardware-assisted paravirtualized hardware watchdog is described that is used to detect and recover from computer malfunctions. A computing device determines that a hardware-implemented watchdog of the computing device does not comply with predetermined watchdog criteria, where the hardware-implemented watchdog is configured to send a reset signal when a first predetermined amount of time elapses without receipt of a first refresh signal. If the hardware-implemented watchdog does not comply with the predetermined watchdog criteria, a runtime watchdog service is initialized using a second predetermined amount of time. The runtime watchdog service is directed to periodically send the refresh signal to the hardware-implemented watchdog before an expiration of the first predetermined amount of time that causes the hardware-implemented watchdog to expire. The hardware-implemented watchdog is directed to send the reset signal when the second predetermined amount of time elapses without receipt of a second refresh signal.

17 Claims, 3 Drawing Sheets

(56) References Cited

U.S. PATENT DOCUMENTS

| | | | |
|---|---|---|---|
| 2014/0201578 A1* | 7/2014 | Kosut | G06F 11/0736 |
| | | | 714/55 |
| 2019/0370103 A1* | 12/2019 | Letey | G06F 11/0772 |
| 2020/0159543 A1* | 5/2020 | Novoa | G06F 11/0757 |
| 2022/0100596 A1* | 3/2022 | Sherwin, Jr | G06F 13/4282 |

* cited by examiner

HARDWARE-ASSISTED PARAVIRTUALIZED HARDWARE WATCHDOG

BACKGROUND

Data centers and other computing infrastructure employ various types of physical hardware, such as central processing units (CPUs), graphics processing units (GPUs), network interface cards (NICs), smart network interface cards (smartNICs), memory storage, data processing units (DPUs), and the like. Using the physical hardware, data centers offer up network services that can be accessed remotely by various computing devices. Some network services include computing resources that are virtualized by a hypervisor to offer a multitude of virtual machines (VMs) that serve up virtualized computing software and hardware, for example. In some scenarios, it is beneficial to operate a bare-metal hypervisor that is installed directly onto a physical host without intermediary software. The bare-metal hypervisor provides increased access to and control of underlying hardware resources. As such, the bare-metal hypervisor partitions hardware to consolidate applications and increase efficiency of operation of various computing resources. However, bare-metal hypervisors have various vulnerabilities, especially during boot loading operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a hardware-assisted paravirtualized hardware watchdog that may be employed in bare-metal hypervisor applications among others. While existing bare-metal hypervisors have software-implemented watchdogs that can detect, diagnose, and correct execution when some types of software malfunctions occur, there are various scenarios in which software-implemented watchdogs are unable to assist. For instance, during a boot operation, software-implemented watchdogs are unable to initialize and execute. As such, any malfunctions during a boot operation (or prior to execution of the software-implemented watchdog) may slow down or stop execution of the bare-metal hypervisor and other software executing thereon. In another example, existing software watchdog mechanisms cannot recover from a complete CPU lock-up as the software watchdog mechanisms rely on access to the CPU to execute.

Some physical hardware, such as existing smartNICs, have a hardware-implemented watchdog. However, only a few types of physical hardware implement a SystemReady Base System Architecture (BSA) watchdog implementation, and other types of physical hardware require a developer to create system-on-a-chip (SoC) specific code if watchdog functions are desired. Moreover, existing hardware-implemented watchdogs do not have a period long enough to meet various bare-metal hypervisor requirements. For instance, some bare-metal hypervisors specify that an initial boot timeout should be on the order of minutes, whereas existing hardware-implemented watchdogs operate on a magnitude of a few seconds. As such, bare-metal hypervisors are required to refresh hardware-implemented watchdogs during boot operations, which is not a trivial task to perform especially during boot operations.

According to various embodiments, a hardware-assisted software watchdog service is described that may be implemented in firmware of physical hardware including, but not limited to a smartNIC or other computing device. The hardware-assisted software watchdog can be exposed to an operating system (OS), for example, via a secure monitor call (SMC). To this end, an underlying implementation is abstracted such that a developer is not required to create multiple drivers, and an apparent watchdog timeout interval is decoupled from an actual, underlying capability of a hardware-implemented watchdog. In various embodiments, the hardware-implemented watchdog is still employed. As such, various embodiments may be directed to a hardware- and software-implemented watchdog service. The firmware implementation of the hardware-assisted software watchdog service may be responsible for refreshing a hardware-implemented watchdog, thereby ensuring the ability to recover from a full CPU lockup scenario among other malfunctions.

The hardware-assisted software watchdog service can be implemented in firmware or, more specifically, secure firmware of a variety of types of hardware independent of varying manufacturers and hardware specifications. In other words, a single bare-metal hypervisor image can be loaded on a smartNIC of a first manufacturer, a smartNIC of a second (and different) manufacturer, and so forth, and operate as intended in a hardware-agnostic manner.

According to various embodiments, a system for implementing a hardware-assisted paravirtualized hardware watchdog is described that includes at least one computing device comprising a hardware-implemented watchdog and at least one hardware processor. As may be appreciated, the hardware-implemented watchdog includes a watchdog configured to send a reset signal when a first predetermined amount of time elapses without receipt of a first refresh signal.

The at least one computing device is directed to determine that the hardware-implemented watchdog of the at least one computing device does not comply with predetermined watchdog criteria. In an instance in which the hardware-implemented watchdog does not comply with the predetermined watchdog criteria, the at least one computing device initializes a runtime watchdog service using a second predetermined amount of time. The second predetermined amount of time may be greater than the first predetermined amount of time.

The at least one computing device may then direct the runtime watchdog service to periodically send the refresh signal to the hardware-implemented watchdog before an expiration of the first predetermined amount of time that causes the hardware-implemented watchdog to expire. Additionally, the at least one computing device may direct the hardware-implemented watchdog to send the reset signal when the second predetermined amount of time elapses without receipt of a second refresh signal.

In some embodiments, the tasks performed by the at least one computing device are performed through execution of program instructions, where the program instructions are a portion of firmware of the at least one computing device stored in non-volatile memory (e.g., random-access memory (RAM) or read-only memory (ROM)). The timer callback may include a central processing unit (CPU) timer callback in some embodiments. The reset signal may direct the at least one computing device to enter into a safe mode or perform a device reset.

In various embodiments, the predetermined watchdog criteria may specify a requirement that the hardware-implemented watchdog is capable of handling a period of time above a threshold time, the hardware-implemented watchdog is capable of handling a bite operation that causes a system reset, and the hardware-assisted watchdog has a predefined watchdog offset register. The at least one computing device may include at least one smart network interface card (smartNIC) or other suitable hardware of a data center or like facility.

Through use of an application programming interface during a booting process in which a hardware-implemented watchdog is utilized, computing resources are saved. Notably, purely software-implemented watchdogs utilize resources of the CPU, which monopolizes resources critical for other tasks, especially boot loading tasks. To this end, modifying the behavior of and utilizing an underlying hardware-implemented watchdog allows CPU resources to be saved and devoted to critical tasks, thereby increasing the performance of the computing device.

Figure 1:
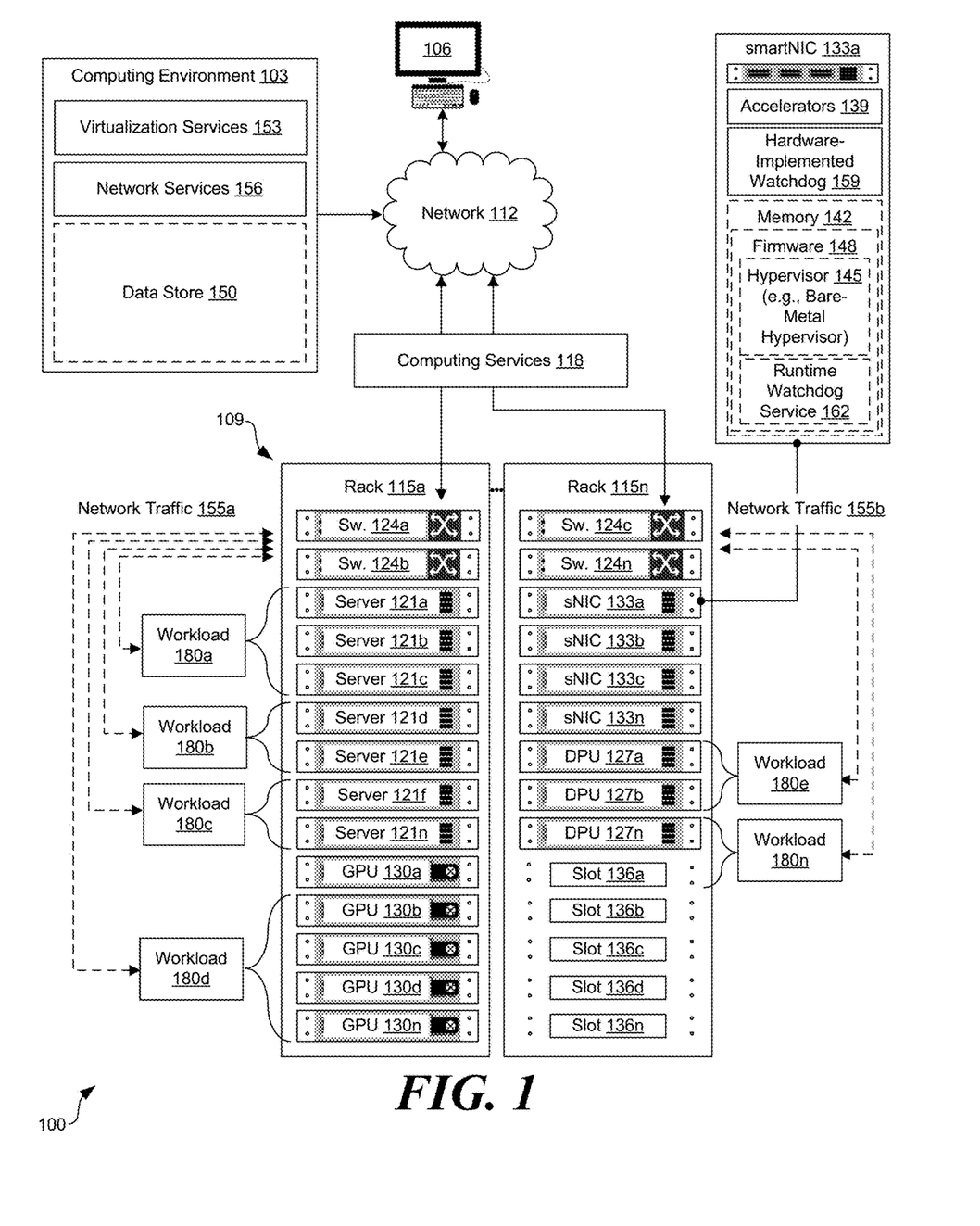
FIG. 1 is a drawing of an example of a networked computing environment for a hardware-assisted paravirtualized hardware watchdog.

Turning now to FIG. 1, an example of a networked environment 100 is shown. The networked environment 100 can include a computing environment 103, client devices 106, and various computing systems 109 in communication with one other over a network 112. The network 112 can include, for example, the Internet, intranets, extranets, wide area networks (WANs), local area networks (LANs), wired networks, wireless networks, other suitable networks, or any combination of two or more such networks.

The network 112 of the networked environment 100 can include satellite networks, cable networks, Ethernet networks, telephony networks, and other types of networks. The computing systems 109 can include devices installed in racks 115a...115n (collectively "racks 115"), which can make up a server bank, aggregate computing system, or a computer bank in a data center or other like facility. In some examples, the computing systems 109 can include high-availability computing systems, which include a group of computing devices that act as a single system and provide a continuous uptime. The devices in the computing systems 109 can include any number of physical machines, virtual machines, virtual appliances, and software associated therewith, such as operating systems, drivers, hypervisors, scripts, and applications.

The computing systems 109, and the various hardware and software components contained therein, can include infrastructure of the networked environment 100 that provide one or more computing services 118. Computing services 118 can include alert services or other application programming interface (API) services. For instance, the computing services 118 can provide an applicant programming interface that permits an application or service to generate, store, retrieve, delete or otherwise interact with alerts. The alerts may be stored in a data store that can include memory accessible by one or more of a plurality of servers 121a...121n (collectively "servers 121"). For instance, the data store can include one or more relational databases, such as structured query language databases, non-SQL databases, time-series databases, or other relational or non-relational databases.

The computing environment 103 can include an enterprise computing environment that includes hundreds or even thousands of physical machines, virtual machines, and other software implemented in devices stored in racks 115, distributed geographically, and connected to one another through the network 112. As such, the computing environment 103 can be referred to as a distributed computing environment in some examples. It is understood that any virtual machine or virtual appliance is implemented using at least one physical device, such as a server or other computing device.

The devices in the racks 115 can include various physical computing resources. The physical computing resources can include, for example, physical computing hardware, such as memory and storage devices, servers 121a...121n (collectively "servers 121"), switches 124a...124n, DPUs 127a...127n, GPUs 130a...130n installed thereon, smartNICs 133a...133n (collectively "smartNICs 133"), central processing units (CPUs), power supplies, and so forth. The devices, such as servers 121, switches 124, DPUs 127, GPUs 130, smartNICs 133, and the like, can have dimensions suitable for quick installation in slots 136a...136n (collectively "slots 136") on the racks 115.

In various examples, the servers 121 can include physical hardware and software to create and manage virtualization infrastructure, a cloud computing environment, an on-premise environment, and/or a serverless computing environment. Also, in some examples, the physical computing resources can be used to provide virtual computing resources, such as virtual machines or other software, as a computing service 118. In various examples, the virtual machines may serve up virtual desktops or other virtualized computing infrastructure.

Each server 121, DPU 127, smartNIC 133, and the like may act as a host in the networked environment 100 and, thereby, may include one or more virtual machines (VMs) executing thereon. Referring to representative smartNIC 133, the smartNICs 133 may include accelerators 139 that offload tasks from CPUs of the servers 121, such as those that manage distributed and virtualization applications. The accelerators 139 may perform networking tasks more efficiently than CPUs of the servers 121. In some implementations, the smartNICs 133 include CPUs and memory 142 such that the operation of the accelerators 139 is configurable by developers and/or administrators (e.g., through programming). Accordingly, smartNICs 133 are often individually referred to as a system-on-a-chip (SoC).

In some examples, a hypervisor 145 can be installed on one or more of the smartNICs 133 and servers 121 to support a virtual machine execution space within which one or more virtual machines can be concurrently instantiated and executed. The hypervisor 145 can include the ESX™ hypervisor by VMware®, the ESXi™ hypervisor by VMware®, the ESXio™ hypervisor by VMware®, or similar hypervisor 145 in some examples. In some examples, the hypervisor 145 is a bare-metal hypervisor.

The bare-metal hypervisor 145 may include a hypervisor installed directly on hardware of a physical machine, such as a smartNIC 133 and/or server 121, for instance, between the hardware and the operating system. To this end, in some examples, the bare-metal hypervisor 145 may be embedded into firmware 148 of the smartNIC 133 and/or server 121, for instance, at the same level as a motherboard basic input/output system (BIOS) or a unified extensible firmware interface (UEFI) system. A bare-metal hypervisor 145 may assist some systems to enable the operating system on a computer to access and use virtualization software. To this end, the firmware 148 may include ARM® firmware or similar firmware 148.

It is understood that the computing systems 109 can be scalable, meaning that the computing systems 109 in the networked environment 100 can increase or decrease dynamically to include or remove servers 121, switches 124, DPUs 127, GPUs 130, smartNICs 133, power sources, and other components without downtime or otherwise impairing performance of the computing services 118 offered up by the computing systems 109.

Referring now to the computing environment 103, the computing environment 103 can include, for example, a server 121 or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 109, it is understood that in some examples the computing environment 103 can be included as all of or a part of the computing systems 109.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 109 and client devices 106 over the network 112, sometimes remotely, the computing environment 103 can be described as a remote computing environment 103 in some examples. Additionally, in various examples, the computing environment 103 can be implemented in servers 121 of a rack 115, and can manage operations of a virtualized or cloud computing environment through interaction with the computing services 118.

The computing environment 103 can include a data store 150, which can include one or more databases in some examples. The data store 150 can include memory of the computing environment 103, mass storage resources of the computing environment 103, or any other storage resources on which data can be stored by the computing environment 103. The data store 150 can include memory of the servers 121 in some examples. The data store 150 can include one or more relational databases, such as structured query language databases, non-SQL databases, or other relational or non-relational databases. The data stored in the data store 150, for example, can be associated with the operation of the various services or functional entities described below. The components executed on the computing environment 103 can include, for example, virtualization services 153, network services 156, as well as other applications, services, processes, systems, engines, or functionality not discussed in detail herein.

Ultimately, the various physical and virtual components of the computing systems 109 can process workloads 180a...180n as a result of network traffic 155a, 155b generated by the various components of the networked environment 100. Workloads 180 can refer to the amount of processing that a server 121, switch 124, DPU 127, GPU 130, smartNIC 133, or other physical or virtual component has been instructed to process or route at a given time. The workloads 180 can be associated with virtual machines, public cloud services, private cloud services, hybrid cloud services, virtualization services 153, device management services, containers, or other software executing on the servers 121 (and thus, in the computing environment 103).

Referring back to the representative smartNIC 133a, the smartNIC 133a (or other computing device) may include a hardware-implemented watchdog 159. The hardware-implemented watchdog 159 may include a watchdog that is configured in a physical circuit or computing system to send a reset signal when a predetermined amount of time elapses without receipt of a refresh signal. For instance, a timer will increment downwards until a predetermined amount of time has expired, thereby causing the hardware-implemented watchdog 159 to send the reset signal. The reset signal may direct the device to enter into a safe mode of operation, perform a system reset, recycle or reboot the device, or similar operation, as may be appreciated. The hardware-implemented watchdog 159 may be contrasted with a software-implemented watchdog that lacks the ability to act on a timer expiration without riquiring software compliance to run an action (and be in a position to detect expiration, correctly operate, etc.).

The firmware 148 may further include a runtime watchdog service 162. It may be desirable to have a single image of a hypervisor 145 (e.g., a bare-metal hypervisor 145) that can be installed and operate on a device regardless of a type, model, manufacturer, specifications, etc., of the device. For instance, a same image of the hypervisor 145 that can execute as intended on a certain model of smartNIC 133 manufactured by AlphaCo may also be used to execute as intended on a varying model of smartNIC 133 manufactured by BetaCo. It is understood that these smartNICs may have varying models, manufacturers, specifications, and so forth. Also, the hardware-implemented watchdogs 159 may operate differently on different types of devices.

Further, for performing boot operations in association with a bare-metal hypervisor 145, it may be desirable that the hardware-implemented watchdog 159 is capable of handling long periods without sending reset signals. In other words, it is not desirable for the hardware-implemented watchdog 159 to send reset signals while the bare-metal hypervisor 145 is being booted or otherwise brought online. As such, it can be desirable to have a hardware-implemented watchdog 159 that is capable of idling for a predetermined amount of time (e.g., approximately five minutes) without sending a reset signal. For example, ARM® Base System Architecture compliant watchdogs have a 48-bit watchdog offset register (WOR), which is sufficient for allowing the hardware-implemented watchdog 159 to idle for approximately five minutes depending on a frequency of a clock feeding the hardware-implemented watchdog 159. It is further desirable that the hardware-implemented watchdog 159 be capable of performing a "bite" operation that causes a system reset.

If the hardware-implemented watchdog 159 is not capable of idling for the predetermined time and/or performing the bite operation, then functionality of a suitable watchdog may be paravirtualized. In other words, the device (e.g., smartNIC 133 or server 121) may be configured to handle greater idling times and perform other operations as needed to boot a bare-metal hypervisor 145. The paravirtualization of the hardware-implemented watchdog 159 may include the firmware 148 having a runtime watchdog service 162 stored therein.

In some embodiments, the runtime watchdog service 162 may use the same units as a generic timer (e.g., driven by CNTFRQ_EL0) and may have the same constraints as the BSA generic watchdog. While implementations leveraging only the secure timer is possible, other implementations may include using and refreshing the hardware-implemented watchdog 159 to avoid system resets during a boot of a bare-metal hypervisor 145, for example. Through operations of the runtime watchdog service 162, the device will be able to recover from situations where all processing cores are jammed with processing tasks, and exceptions are unable to be handled.

Figure 2:
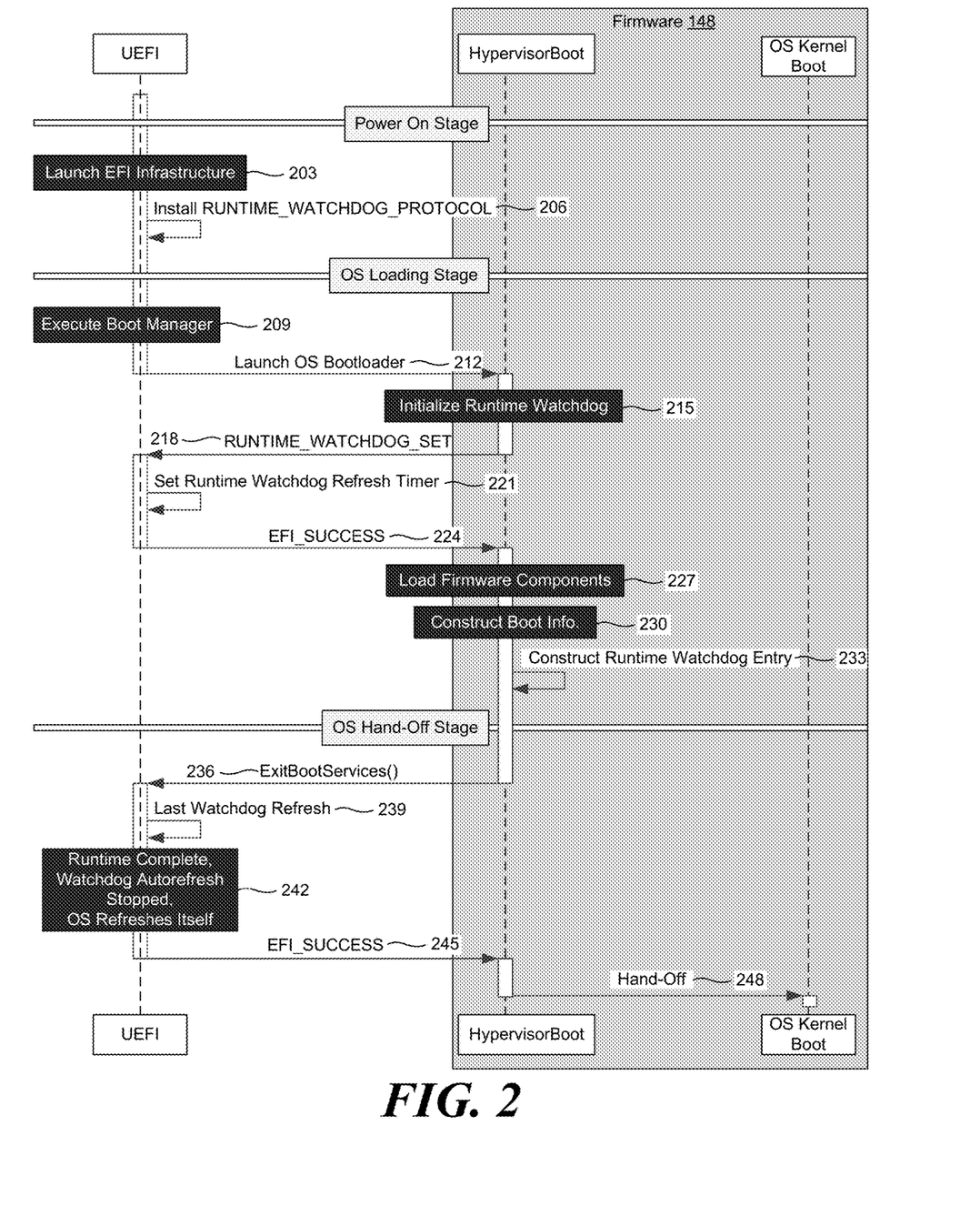
FIG. 2 is a sequence diagram illustrating a boot operation in which a paravirtualized watchdog is employed by a runtime watchdog service.

Referring now to FIG. 2, a non-limiting example of a sequence diagram is shown according to various embodiments. Initially, a smartNIC 133 or other device may include firmware 148 having UEFI or BIOS firmware that oversees boot operations. While shown separate from the firmware 148, it is understood that the UEFI may be a part of the firmware 148. The firmware 148 may include or further include a hypervisor boot operation ("HypervisorBoot") for booting a hypervisor 145, as well as an operating system kernel boot process ("OS Kernel Boot") for booting an operating system. To this end, the hypervisor 145 may include a bare-metal hypervisor 145 in some examples.

First, at box 203, during a power-on stage (e.g., immediately following a physical powering on of a device, such as a smartNIC 133 or a server 121), the UEFI system on the device will launch EFI Infrastructure that permits EFI-compliant executables to be executed. At box 206, the UEFI system can be configured to install a runtime watchdog protocol during the power-on stage, for example. The runtime watchdog protocol can be invoked to initialize a runtime watchdog service 162, as will be described.

Thereafter, the process proceeds to the operating system loading stage. There, at box 209, the UEFI system may execute a boot manager configured to handle and oversee a boot process. At box 212, the boot manager launches an operating system bootloader, which includes executable code that initializes and launches an operating system. At box 215, HypervisorBoot may initialize the runtime watchdog service 162. Initializing the runtime watchdog service 162 can include invoking a runtime watchdog protocol function using input parameters.

Thereafter, at boxes 218 and 221, the runtime watchdog service 162 may set a runtime watchdog refresh timer, for instance, by invoking a RUNTIME_WATCHDOG_SET function of the runtime watchdog protocol ("RUNTIME_WATCHDOG_PROTOCOL"). The UEFI system, at box 224, may respond by returning a success signal ("EFI_SUCCESS") to the HypervisorBoot process if the watchdog refresh timer is successfully set.

At box 227, the HypervisorBoot process may load bare-metal hypervisor 145 components used to execute the bare-metal hypervisor 145. At box 230, the HypervisorBoot process may construct boot information data, which may include a table, data object, or other collection of data. At box 233, the HypervisorBoot process may construct a runtime watchdog entry for a table, database, or other suitable memory location.

Thereafter, the process proceeds to the operating system hand-off stage. At box 236, the ExitBootServices( )function is invoked after a predetermined set of boot operations have completed. Next, at box 239, the HypervisorBoot process may perform a last watchdog refresh to prevent the hardware-implemented watchdog 159 from lapsing during a hand-off from the UEFI system to the operating system. At box 242, the runtime of the UEFI system is complete, and the UEFI system will no longer refresh the watchdog. Instead, the operating system will refresh the hardware-implemented watchdog 159. As such, at box 245, the UEFI system will send an EFI success signal to the HypervisorBoot process, which then hands-off operation of the hardware-implemented watchdog 159 to a kernel of the operating system at box 248. Thereafter, the process can proceed to completion.

Figure 3:
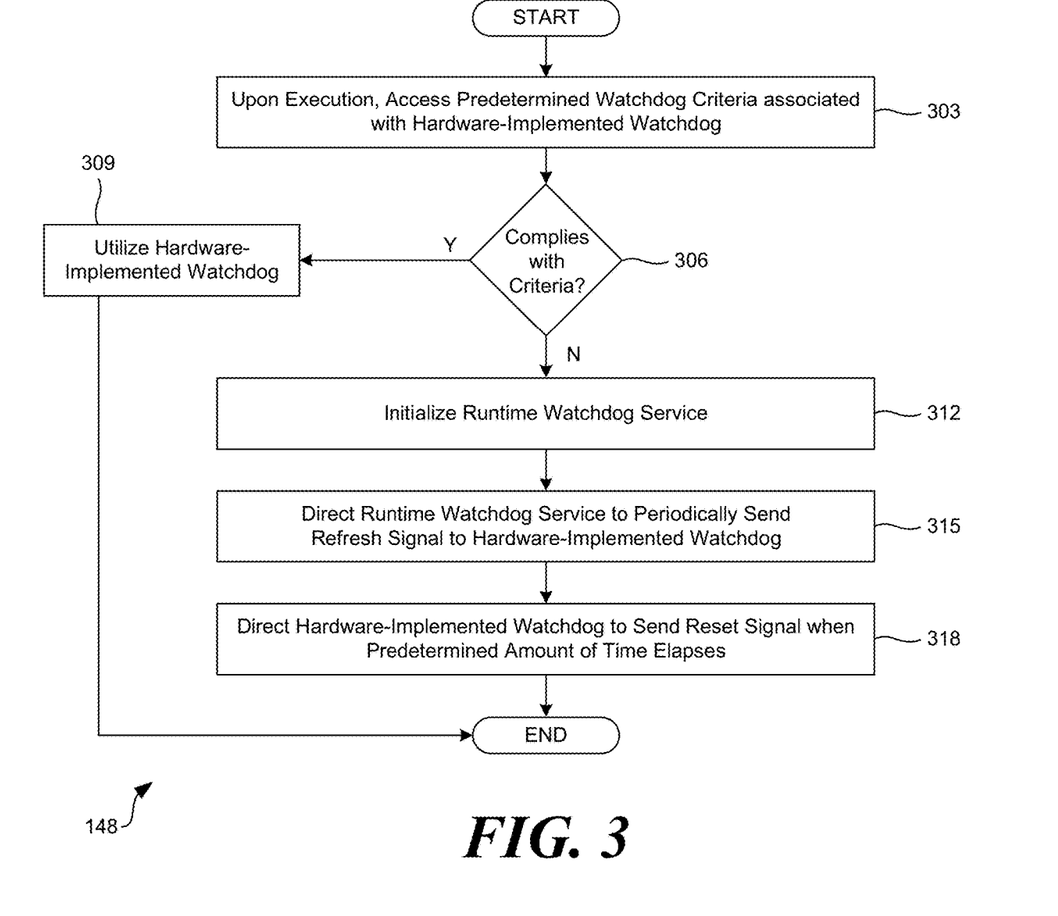
FIG. 3 is a flowchart illustrating functionality implemented by components of a smartNIC or other computing device of the networked environment of FIG. 1.

Moving on to FIG. 3, a flowchart is shown that provides one example of the operation of a portion of the networked environment 100. The flowchart of FIG. 3 can be viewed as depicting an example of elements of a method implemented by the runtime watchdog service 162 and/or other firmware 148 executing in the smartNIC 133 or other computing device according to one or more examples. The separation or segmentation of functionality as discussed herein is presented for illustrative purposes only.

The flowchart of FIG. 3 describes implementing a hardware-assisted software watchdog in firmware 148 that is exposed to an operating system through a secure monitor call. Accordingly, there is no need for developers or other personnel to write drivers beyond a driver needed for an SMC interface. Further, the apparent watchdog timeout interval is decoupled from the actual, underlying capability of the hardware-implemented watchdog 159. Notably, the hardware-implemented watchdog 159 is still employed. As such, various implementations include a software-implemented watchdog that relies on and utilizes a hardware-implemented watchdog 159. In other words, an implementation of a runtime watchdog service 162 in the firmware 148 is responsible for refreshing the hardware-implemented watchdog 159. This ensures the ability of a smartNIC 133 or other computing device to recover from a full CPU lockup scenario among others. To this end, a paravirtualized watchdog is described that is used to detect and recover from computer malfunctions, such as those that occur on a smartNIC 133 during a boot operation of a bare-metal hypervisor 145.

Beginning with box 303, the firmware 148 may access predetermined watchdog criteria. In some embodiments, the predetermined watchdog criteria may be hardcoded or otherwise part of an image of a bare-metal hypervisor 145 that is installed on one of a multitude of different types of devices (e.g., smartNICs 133 made by varying manufacturers and having different models and specifications). Generally, the predetermined watchdog criteria may include criteria that assists a boot loading process being performed where the boot loading process may have non-traditional requirements. For instance, by installing some types of a bare-metal hypervisor 145, operating systems, or other low-level software on a smartNIC 133, various boot loading operations may cause the system to process data in such a fashion that the hardware-implemented watchdog 159 sends reset signals although boot loading operations are proceeding, thereby interrupting a boot cycle.

Next, in box 306, the firmware 148 may determine whether the hardware-implemented watchdog 159 of the smartNIC 133 or other computing device complies with the predetermined watchdog criteria accessed in box 303. As noted above, the hardware-implemented watchdog 159 may include a watchdog implemented in hardware of a device that is configured to send a reset signal when a predetermined amount of time elapses without receipt of a refresh signal. To facilitate boot operations for a bare-metal hypervisor 145, the predetermined watchdog criteria may specify various requirements, such as the hardware-implemented watchdog 159 being capable of handling a period of time above a threshold time (e.g., five minutes or other desired time), the hardware-implemented watchdog 159 being capable of handling a bite operation (or other similar operation) that causes a system reset, the hardware-implemented watchdog 159 having a predefined watchdog offset register, among other criteria. The predetermined watchdog criteria, for instance, may require that the predefined watchdog offset register be a 48-bit watchdog offset register or other suitable size register.

If the hardware-implemented watchdog 159 complies with the predetermined watchdog criteria, the process may proceed to box 309. In box 309, the firmware 148 may utilize the hardware-implemented watchdog 159 as configured in the smartNIC 133 or other computing device. In other words, the hardware-implemented watchdog 159 will proceed as configured by the manufacturer of the smartNIC 133 or other computing device. Thereafter, the process may proceed to completion, whereby a boot process may be performed using the standard hardware-implemented watchdog 159.

Referring back to box 306, if the firmware 148 determines that the hardware-implemented watchdog 159 does not comply with the predetermined watchdog criteria, the process may proceed to box 312. In box 312, the firmware 148 (e.g., a UEFI or BIOS system) may initialize a runtime watchdog service 162. The runtime watchdog service 162 may paravirtualize functionality of the hardware-implemented watchdog 159 as will be described. To this end, the smartNIC 133 or other computing device may be configured to handle greater idling times and perform other operations as needed to boot a bare-metal hypervisor 145, operating system, or other low-level software.

In some embodiments, the firmware 148 initializes the runtime watchdog service 162 by invoking a function call using a predetermined amount of time (e.g., a second predetermined amount of time) that may exceed or be greater than the amount of time used to reset the hardware-implemented watchdog 159 (e.g., the first predetermined amount of time). In various embodiments, the runtime watchdog service 162 is initialized by a the UEFI service during an operating system loading stage of a boot process. The runtime watchdog service 162 may be further initialized in response to a secure monitor call invoked by an operating system loading service or a bare-metal hypervisor loading service, as shown in FIG. 2.

Referring again to FIG. 3, in some embodiments, the firmware 148 utilizes a SetWdtTimeout( )secure monitor call that is exposed to an operating system or other firmware 148 via an advanced configuration and power interface (ACPI) table. The runtime watchdog service 162 may utilize the same units as a generic watchdog timer (e.g., driven by counter-timer frequency register CNTFRQ_EL0) and may have the same constraints as a BSA generic watchdog. While some implementations may merely leverage the secure timer, other implementations may use and refresh the hardware-implemented watchdog 159. This ensures the ability to recover from unlikely, but possible, situations where all processing cores are jammed and are unable to handle exceptions.

In embodiments in which the SetWdtTimeout( )secure monitor call implements BSA Generic Watchdog constraints, a wdt_ticks_t value may be a 64-bit value that uses the same units as the generic timer run at CNTFRQ_EL0. A value of zero may disable the runtime watchdog service 162.

In some embodiments, values over 48 bits may not be supported. To this end, this is implemented with an identifier in the 64-bit original equipment manufacturer (OEM) service call range. An ACPI table may be employed to declare the availability of the facility.

Thereafter, in box 315, the firmware 148 may direct the runtime watchdog service to periodically send a refresh signal to the hardware-implemented watchdog 159, for instance, before an expiration of a predetermined amount of time that causes the hardware-implemented watchdog 159 to expire and send a reset signal.

In box 318, the firmware 148 may direct the hardware-implemented watchdog 159 to send, or the standard functionality of the hardware-implemented watchdog 159 may itself send, the reset signal when a predetermined amount of time elapses without receipt of a refresh signal. The reset signal may direct the smartNIC 133 or other computing device to enter into a safe mode, perform a device reset, or perform another predetermined operation as desired.

Various operations described in FIG. 3 may be performed by a computing device through execution of program instructions. The program instructions may be a portion of firmware 148 stored in non-volatile memory, such as memory 142 of a smartNIC 133 or other computing device.

Stored in the memory device are both data and several components that are executable by the processor. Also stored in the memory can be a data store 150, firmware 148, and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, RAM, ROM, hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touch-screen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application.

Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for implementing a hardware-assisted paravirtualized hardware watchdog, comprising:
   at least one computing device comprising a hardware-implemented watchdog and at least one hardware processor; and
   program instructions stored in memory and executable by the at least one computing device that, when executed by the at least one hardware processor, direct the at least one computing device to:
   determine that the hardware-implemented watchdog of the at least one computing device does not comply with predetermined watchdog criteria, the hardware-implemented watchdog configured to send a reset signal when a first predetermined amount of time elapses without receipt of a first refresh signal, wherein the predetermined watchdog criteria specifies a requirement that the hardware-implemented watchdog is capable of handling a period of time above a threshold time, the hardware-implemented watchdog is capable of handling a bite operation that causes a system reset, and the hardware-assisted watchdog has a predefined watchdog offset register;
   in response to the hardware-implemented watchdog not complying with the predetermined watchdog criteria, initialize a runtime watchdog service using a second predetermined amount of time, the second predetermined amount of time being greater than the first predetermined amount of time;
   direct the runtime watchdog service to periodically send the first refresh signal to the hardware-implemented watchdog before an expiration of the first predetermined amount of time that causes the hardware-implemented watchdog to expire; and
   direct the hardware-implemented watchdog to send the reset signal when the second predetermined amount of time elapses without receipt of a second refresh signal.

2. The system of claim 1, wherein:
   the program instructions are a portion of firmware of the at least one computing device stored in non-volatile memory; and
   the reset signal directs the at least one computing device to enter into a safe mode or perform a device reset.

3. The system of claim 1, wherein the runtime watchdog service is initialized by a Unified Extensible Firmware Interface (UEFI) service during an operating system loading stage of a boot process.

4. The system of claim 3, wherein the runtime watchdog service is further initialized in response to a secure monitor call (SMC) invoked by an operating system loading service or a bare-metal hypervisor loading service.

5. The system of claim 1, wherein the runtime watchdog service is accessible to an operating system or a bare-metal hypervisor by providing information related to the runtime watchdog service in an advanced configuration and power interface (ACPI) table.

6. The system of claim 1, wherein the at least one computing device is at least one smart network interface card (smartNIC).

7. A computer-implemented method, comprising:
determining that a hardware-implemented watchdog of at least one computing device does not comply with predetermined watchdog criteria, the hardware-implemented watchdog configured to send a reset signal when a first predetermined amount of time elapses without receipt of a first refresh signal;
in response to the hardware-implemented watchdog not complying with the predetermined watchdog criteria, initializing a runtime watchdog service using a second predetermined amount of time, the second predetermined amount of time being greater than the first predetermined amount of time, wherein the predetermined watchdog criteria specifies a requirement that the hardware-implemented watchdog is capable of handling a period of time above a threshold time, the hardware-implemented watchdog is capable of handling a bite operation that causes a system reset, and the hardware-assisted watchdog has a predefined watchdog offset register;
directing the runtime watchdog service to periodically send the first refresh signal to the hardware-implemented watchdog before an expiration of the first predetermined amount of time that causes the hardware-implemented watchdog to expire; and
directing the hardware-implemented watchdog to send the reset signal when the second predetermined amount of time elapses without receipt of a second refresh signal.

8. The computer-implemented method of claim 7, wherein:
the computer-implemented method is performed through execution of a portion of firmware of the at least one computing device stored in non-volatile memory; and
the reset signal directs the at least one computing device to enter into a safe mode or perform a device reset.

9. The computer-implemented method of claim 7, wherein the runtime watchdog service is initialized by a Unified Extensible Firmware Interface (UEFI) service during an operating system loading stage of a boot process.

10. The computer-implemented method of claim 9, wherein the runtime watchdog service is further initialized in response to a secure monitor call (SMC) invoked by an operating system loading service or a bare-metal hypervisor loading service.

11. The computer-implemented method of claim 7, wherein the runtime watchdog service is accessible to an operating system or a bare-metal hypervisor by providing information related to the runtime watchdog service in an advanced configuration and power interface (ACPI) table.

12. The computer-implemented method of claim 7, wherein the at least one computing device is at least one smart network interface card (smartNIC).

13. A non-transitory computer-readable medium having program instructions stored thereon executable by at least one hardware processor that, when executed by the at least one hardware processor, direct the at least one hardware processor to:
determine that a hardware-implemented watchdog of at least one computing device does not comply with predetermined watchdog criteria, the hardware-implemented watchdog configured to send a reset signal when a first predetermined amount of time elapses without receipt of a first refresh signal;
in response to the hardware-implemented watchdog not complying with the predetermined watchdog criteria, initialize a runtime watchdog service using a second predetermined amount of time, the second predetermined amount of time being greater than the first predetermined amount of time, wherein the predetermined watchdog criteria specifies a requirement that the hardware-implemented watchdog is capable of handling a period of time above a threshold time, the hardware-implemented watchdog is capable of handling a bite operation that causes a system reset, and the hardware-assisted watchdog has a predefined watchdog offset register;
direct the runtime watchdog service to periodically send the first refresh signal to the hardware-implemented watchdog before an expiration of the first predetermined amount of time that causes the hardware-implemented watchdog to expire; and
direct the hardware-implemented watchdog to send the reset signal when the second predetermined amount of time elapses without receipt of a second refresh signal.

14. The non-transitory computer-readable medium of claim 13, wherein:
the program instructions are a portion of firmware of the at least one computing device stored in non-volatile memory;
the reset signal directs the at least one computing device to enter into a safe mode or perform a device reset; and
the at least one computing device is at least one smart network interface card (smartNIC).

15. The non-transitory computer-readable medium of claim 13, wherein the runtime watchdog service is initialized by a Unified Extensible Firmware Interface (UEFI) service during an operating system loading stage of a boot process.

16. The non-transitory computer-readable medium of claim 15, wherein the runtime watchdog service is further initialized in response to a secure monitor call (SMC) invoked by an operating system loading service or a bare-metal hypervisor loading service.

17. The non-transitory computer-readable medium of claim 13, wherein the runtime watchdog service is accessible to an operating system or a bare-metal hypervisor by providing information related to the runtime watchdog service in an advanced configuration and power interface (ACPI) table.

\* \* \* \* \*